(No Model.)  2 Sheets—Sheet 1.
C. W. DUTCHER.
POTATO DIGGER.
No. 259,510. Patented June 13, 1882.
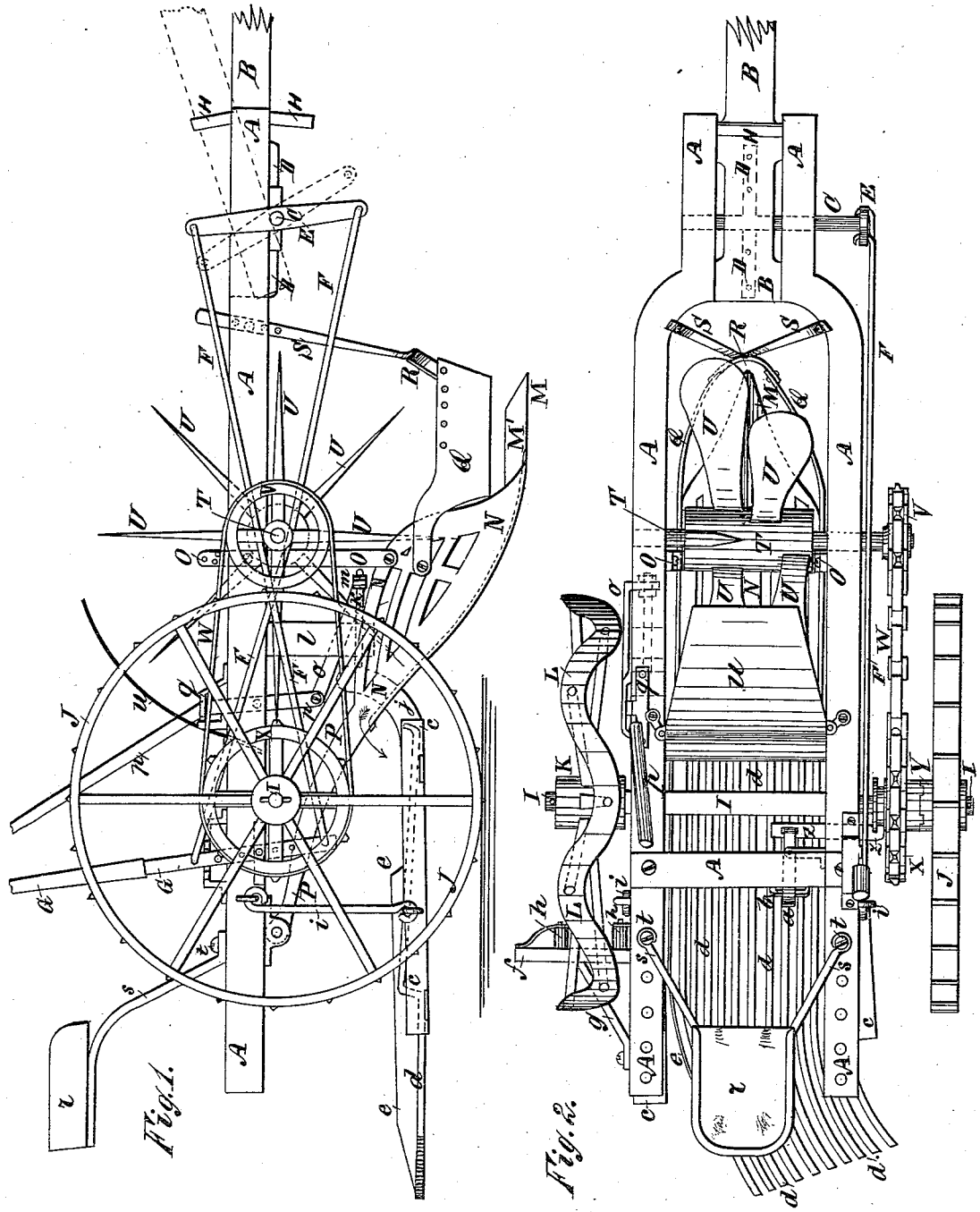
WITNESSES:
Theo. G. Hoskin
C. Sedgwick
INVENTOR:
C. W. Dutcher
BY Munn & Co.
ATTORNEYS.

(No Model.) 2 Sheets—Sheet 2.

C. W. DUTCHER.
POTATO DIGGER.

No. 259,510. Patented June 13, 1882.

WITNESSES:
Theo. G. Hoster
C. Sedgwick

INVENTOR:
C. W. Dutcher
BY Munn & Co.
ATTORNEYS.

UNITED STATES PATENT OFFICE.

CHARLES W. DUTCHER, OF MILLTOWN, ST. STEPHEN, NEW BRUNSWICK, CANADA.

POTATO-DIGGER.

SPECIFICATION forming part of Letters Patent No. 259,510, dated June 13, 1882.

Application filed September 8, 1881. (No model.)

*To all whom it may concern:*

Be it known that I, CHARLES W. DUTCHER, of Milltown, St. Stephen, New Brunswick, Dominion of Canada, have invented certain new and useful Improvements in Potato-Diggers, of which the following is a specification.

Figure 4:
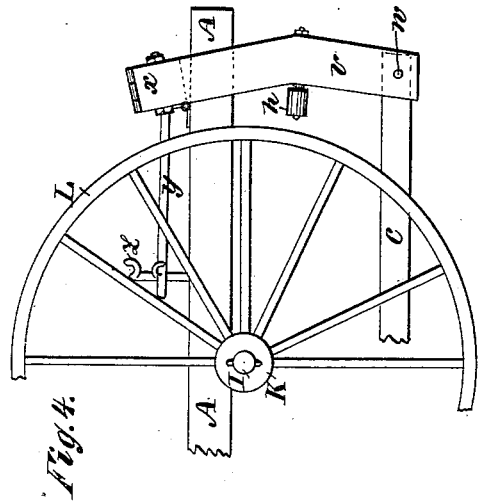
Figure 6:
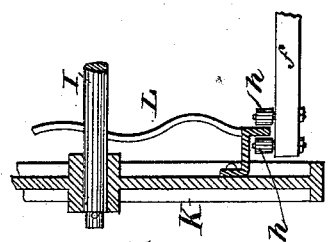
Figure 3:
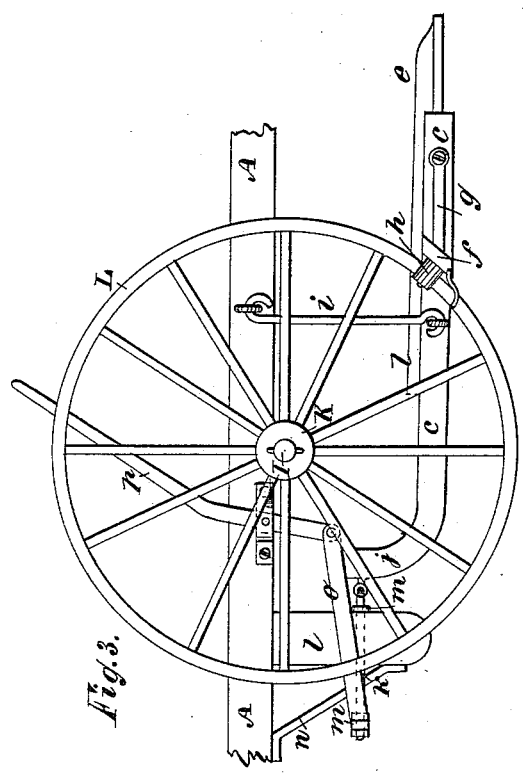
Figure 5:
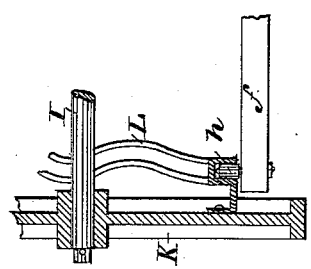

In the accompanying drawings, Figure 1, Sheet 1, is a side elevation of my improvement. Fig. 2, Sheet 1, is a plan view of the same. Fig. 3, Sheet 2, is a side elevation of the left-hand rear part of the machine, showing the mechanism for throwing the shaker out of gear. Fig. 4, Sheet 2, shows a modification of the same. Fig. 5, Sheet 2, shows a modification of the zigzag wheel. Fig. 6, Sheet 2, shows another modification of the same.

Similar letters of reference indicate corresponding parts.

The object of this invention is to facilitate the digging of potatoes and their separation from the soil.

The invention consists in a novel construction and arrangement of parts, as hereinafter fully described.

In the drawings, A represents the frame of the machine, which consists of two side bars connected by one or more cross-bars. The forward ends of the side bars of the frame A are curved inward and then forward parallel with each other, and to and between them is hinged the tongue B by a rod, C, attached to the lower side of the said tongue B, and which works in bearings attached to the lower side of the forward ends of the side bars of the frame A.

The connection between the tongue B and the rod C is strengthened by the arms D, formed upon or attached to the said rod, and which project along and are secured to the under side of the said tongue.

To one end of the hinging-rod C is attached an upright equal-armed lever, E, to the ends of which are hinged the forward ends of two rods, F. The rods F cross each other, and their rear ends are hinged to an upright lever, G, upon the opposite sides of and equally distant from its pivot. The lever G is pivoted to the side bar of the frame A, and its upper end projects into such a position that it can be conveniently reached and operated by the driver from his seat to raise and lower the share, as required.

If desired, the levers E G can be made with single arms and connected by a single rod, F, so that the share will be raised by the action of the said levers and connecting-rod and lowered by its own weight.

The movement of the frame A and tongue B upon each other is limited by a double clevis, H, attached to the inner sides of the forward ends of the side bars of the frame A and passing above and below the said tongue.

The side bars of the frame A, a little in the rear of their centers, are attached to the axle I, upon the right-hand journal of which revolves the drive-wheel J. The face of the drive-wheel J is corrugated to prevent it from slipping upon the ground.

Upon the left-hand journal of the axle I revolves the wheel K, which is provided with a zigzag rim, L. The zigzag rim L can be attached to the outer ends of the spokes of the said wheel, so as to serve also for the face or tread of the wheel, as shown in Fig. 2; or the wheel K can be made with an ordinary face or tread and the zigzag rim L attached to the spokes of the said wheel at a suitable distance from their outer ends, as shown in Figs. 5 and 6. The zigzag rim L is made with the inclines that move the shaker to the right short and the inclines that move it to the left long, so that the said zigzag rim will give the said shaker a quick movement to the right and a slower movement to the left to aid in throwing the potatoes toward the right-hand side of the machine.

M is the share, which is made with an angular edge, with its wings slightly curved upward at their outer sides, and with a central longitudinal rib, M', to break up the hills as the share passes beneath them, and thus facilitate the separation of the potatoes and soil. The share M is secured detachably to the side bars of the scoop N, so that the said share, should it become worn or broken, can be readily replaced with a new one. The bottom and sides of the scoop N are slotted, or are formed of slats, to allow the loose soil to fall through, and thus lessen the amount of soil that passes up with the potatoes to the shaker.

To the upper forward parts of the sides of the scoop N are hinged the lower ends of two bars or hangers, O, the upper ends of which are bolted to the inner sides of the side bars of the frame A. Several holes are formed in the upper ends of the bars O to receive the fastening-bolts, so that the forward end of the scoop N and the share M can be adjusted to work deeper or shallower in the ground, as may be required.

To the rear corners of the scoop N are attached the forward ends of the bars P, the rear ends of which are hinged to the lower sides of the rear part of the side bars of the frame A. The bars P are thus brought into line, or nearly so, with the rearward pressure of the share and scoop, and are thus better adapted to resist the said pressure.

To the forward part of the sides of the scoop N are attached the rear ends of the guards or scrapers Q, the lower edges of which are bent outward to adapt them to scrape weeds, stones, clods, and the top soil off the tops of the hills, to prevent the said weeds, stones, clods, and top soil from being carried up the scoop.

The upper corners of the forward ends of the guards Q are attached to the end parts of an arched bar, R, a sufficient space being left between the said forward ends of the guards Q to allow the potato-stalks to pass through.

To the center of the arched bar R are attached the lower ends of two bars, S, which incline from each other, and their upper ends are attached to the forward parts of the side bars of the frame A. Several holes are formed in the upper parts of the bars S to receive the fastening-bolts, so that the forward ends of the guards Q can be adjusted higher or lower, as may be required.

To the side bars of the frame A, above the forward part of the scoop N, is journaled a shaft, T, to which are attached a number of radial arms, wings, or paddles, U, of such a length as to reach nearly to the said scoop N.

To the projecting end of one of the journals of the shaft T is attached a chain-wheel, V, around which passes an endless chain, W. The endless chain W also passes around a larger chain-wheel, X, which revolves upon a journal formed upon the axle I at the inner side of the drive-wheel J. The inner end of the hub of the drive-wheel J and the outer end of the hub of the chain-wheel X have clutch-teeth Y formed upon them, so that the said chain-wheel can be thrown into and out of gear with the drive-wheel by sliding the said chain-wheel upon its journal. The inner end of the hub of the chain-wheel X has a ring-groove formed upon it to receive the forked outer end of the bar Z, which slides in bearings attached to the lower side of the side bar of the frame A.

To the inner end of the sliding bar Z is pivoted the lower end of a foot-lever, $a$, which is pivoted to a support attached to the side bar of the frame A. The upper end of the lever $a$ projects into such a position that it can be conveniently reached and operated by the driver with his foot.

The upper part of the foot-lever $a$ passes through a keeper, $b$, attached to the cross-bar of the frame A, and which has two notches or recesses formed in it to receive the said lever, so that the chain-wheel will be locked in place when in gear with the drive-wheel J and when out of gear with the said drive-wheel.

$c$ is the shaker-frame, the forward end of which is placed beneath the rear end of the scoop N, so that the shaker will receive the potatoes and soil from said scoop. The shaker is formed by attaching rods $d$ to the cross-bars of the frame $c$ at such a distance apart that potatoes cannot pass between the said rods. The rods $d$ are attached to the lower side of the forward cross-bar of the frame $c$ to prevent the potatoes from escaping at the forward end of the shaker, and to the upper side of the other cross-bars, so that the said potatoes can pass back unobstructed. The rods $d$ are secured to the cross-bars of the frame $c$ by staples or other suitable means. The rear ends of the rods $d$ project and are curved toward the right-hand side of the machine, so as to deliver the potatoes toward the said right-hand side. The rods $d$ have a downward offset formed in them to give the potatoes a jar as they pass back, and thus shake off any soil that may adhere to them.

To the left-hand part of the shaker $c\ d$ is attached a guard strip or flange, $e$, to prevent any potatoes from passing off at the left-hand side of the shaker, and thus being in the way of the machine in its next passage.

To the rear part of the left-hand side of the shaker-frame $c$ is attached an arm, $f$, which is strengthened in place by the brace $g$.

To the forward side of the arm $f$ are pivoted two rollers, $h$, at such a distance apart as to receive the zigzag rim L of the wheel K, so that the shaker $c\ d$ will be vibrated by the revolution of the zigzag wheel K L.

In case a slotted rim L is used only one roller $h$ will be required, which roller will enter and move along the slot in the said rim L.

The shaker $c\ d$ is suspended by rods $i$, the lower ends of which are pivoted to the side bars of the shaker-frame $c$, and their upper ends are pivoted to the side bars of the carriage-frame A.

To the left-hand forward corner of the shaker-frame $c$ is attached, or upon it is formed, an arm, $j$, to the upper end of which is pivoted the rear end of a rod, $k$. The rod $k$ passes through and slides in a bearing in the lower end of the hanger $l$, and has a screw-thread cut upon it to receive the nuts $m$, placed upon its end parts to limit its movement in the said hanger. The hanger $l$ is attached at its upper end to a side bar of the frame A, and is strengthened in position by a brace, $n$, attached to it and to the said side bar of the frame A.

With the forward end of the sliding rod $k$ is connected the forward end of the bar $o$, the rear end of which is hinged to the lower end of the lever $p$. The lever $p$ is pivoted to the side bar of the carriage-frame A, and its upper end projects into such a position that it can be conveniently reached and operated by the driver from his seat. The lever $p$ moves along the edge of an arched bar, $q$, the ends of which are attached to the side bar of the frame A, and which has notches or shoulders formed upon its edge to receive and hold the said lever $p$ in either position. With this construction, by operating the lever $p$ the shaker $c\ d$ can be swung back to throw the rollers $h$ out of contact with the zigzag rim L, and thus prevent the shaker from being vibrated by the advance of the machine and swung forward to bring the said rollers $h$ again into contact with the zigzag rim L.

In the modification shown in Fig. 4 the rollers $h$ are pivoted to a hanger, $v$, which is connected at its lower end with the shaker-frame $c$ by a rod, $w$, and is hinged at its upper end to the end of the cross-bar $x$, so that the lateral movements of the hanger $v$ will vibrate the shaker $c\ d$. The cross-bar $x$ is hinged to the side bars of the frame A, so that the said cross-bar can be rocked to throw the rollers $h$ into and out of gear with the zigzag rim L. In this case the cross-bar $x$ is rocked by means of a lever, $y$, attached to it, and which moves along a catch-rod, $z$, attached to the frame A.

$r$ is the driver's seat, which is attached to the upper ends of the spring-standards $s$, the lower ends of which are secured to the rear parts of the side bars of the frame A by bolts $t$.

Several holes are formed in the side bars of the frame A to receive the fastening-bolts $t$, so that the driver's seat can be readily moved forward or back to cause the driver's weight to properly balance the machine.

$u$ is a curved plate, the rear part of which is secured to the frame A a little in the rear of the paddles U, to prevent the driver from being annoyed by soil thrown by the said paddles.

Having thus fully described my invention, I claim as new and desire to secure by Letters Patent—

1. In a potato-digger, the combination, with the frame A and the tongue B, of the rod C, the armed lever E, the connecting-rods F, and the lever G, substantially as and for the purpose set forth.

2. In a potato-digger, the combination, with the frame A and the scoop N, of the scraper Q, hinged to the forward part of the scoop, the arched bar R, and the adjustable suspension-rods S, substantially as and for the purpose set forth.

3. In a potato-digger, the combination, with the frame A, the share M, the scoop N, and the drive-wheel J, of the paddles U, the shaft T, carrying the paddles, and the chain and chain-wheels W V X, substantially as herein shown and described, whereby the potatoes are forced up the said scoop, as set forth.

4. In a potato-digger, the combination, with the frame A, the suspension-rods $i$, and the scoop N, of the shaker $c\ d$, curved to one side and provided with an offset in its bottom and a guard-strip at one side, substantially as and for the purpose set forth.

5. In a potato-digger, the combination, with the frame A, the hanger $e$, the scoop N, and the shaker $c\ d$, provided with the arm $f$, of the rod $k$, the bar $o$, and the lever $p$, substantially as and for the purpose set forth.

6. In a potato-digger, the combination, with the shaker $c\ d$ and the wheel K, of the arm $f$, one or more rollers, $h$, and the zigzag rim L, substantially as herein shown and described, whereby the said shaker will be agitated by the revolution of the said wheel, as set forth.

CHARLES WELLINGTON DUTCHER.

Witnesses:
A. D. TAYLOR,
L. A. MILLS.